United States Patent
Okada et al.

[11] Patent Number: 6,108,069
[45] Date of Patent: Aug. 22, 2000

[54] LIQUID CRYSTAL DISPLAY PANEL

[75] Inventors: Hiroyuki Okada, Ishikawa-ken; Kazuhiro Joten, Kanazawa, both of Japan

[73] Assignee: Matsushita Electric Industrial Co., Ltd., Japan

[21] Appl. No.: 09/095,603

[22] Filed: Jun. 11, 1998

[30] Foreign Application Priority Data

Jun. 13, 1997 [JP] Japan .................................. 9-155623

[51] Int. Cl.⁷ .................................................. G02F 1/139
[52] U.S. Cl. .......................................... 349/179; 349/180
[58] Field of Search ................................... 349/175, 179, 349/180, 185, 186

[56] References Cited

U.S. PATENT DOCUMENTS

| | | | |
|---|---|---|---|
| 4,143,947 | 3/1979 | Aftergut et al. ........................ | 349/179 |
| 4,278,328 | 7/1981 | Mukoh et al. .......................... | 349/175 |
| 4,400,059 | 8/1983 | Nagao et al. ............................ | 349/33 |
| 4,529,271 | 7/1985 | Berreman et al. ...................... | 349/175 |

FOREIGN PATENT DOCUMENTS

| | | |
|---|---|---|
| 0231781 | 8/1987 | European Pat. Off. . |
| 0234624 | 9/1987 | European Pat. Off. . |
| 8-122829 | 5/1996 | Japan . |

*Primary Examiner*—William L. Sikes
*Assistant Examiner*—Tai V. Duong
*Attorney, Agent, or Firm*—Parkhurst & Wendel, L.L.P.

[57] ABSTRACT

The present invention provides a liquid crystal display panel that can improve alignment stability, display uniformity, and display quality. By facilitating stable alignment of liquid crystal materials and inducing a twisted alignment, a uniform display can be provided and the balance among the optical characteristics can be improved. In particular, a stable alignment margin can be obtained when the cell thickness d is 7 μm or more and when the twist angle for liquid crystal molecules is 240° or less.

3 Claims, 6 Drawing Sheets

| d (μm) | 6 | 6 | 6 | 6 | 7 | 7 |
|---|---|---|---|---|---|---|
| TWIST ANGLE (°) | 250 | 250 | 250 | 250 | 250 | 240 |
| HTP (μm) | 5 | 5.5 | 6 | 7 | 5 | 5 |
| d/HTP | 1.2 | 1.09 | 1 | 0.857 | 1.4 | 1.4 |
| CHIRAL (wt%) | 0.458 | 0.504 | 0.550 | 0.642 | 0.393 | 0.393 |
| UNIFORMITY | ○ | ○ | △ | × | ◎ | ◎ |

PROVIDED, ◎...BEST, ○...GOOD, △...INDEFINITE, ×...BAD

FIG. 7

| d (μm) | 6 | 6 | 6 | 6 | 7 | 7 |
|---|---|---|---|---|---|---|
| TWIST ANGLE (°) | 250 | 250 | 250 | 250 | 250 | 240 |
| HTP (μm) | 5 | 5.5 | 6 | 7 | 5 | 5 |
| d/HTP | 1.2 | 1.09 | 1 | 0.857 | 1.4 | 1.4 |
| CHIRAL (wt%) | 0.458 | 0.504 | 0.550 | 0.642 | 0.393 | 0.393 |
| UNIFORMITY | ○ | ○ | △ | × | ◎ | ◎ |

PROVIDED, ◎...BEST, ○...GOOD, △...INDEFINITE, ×...BAD

LIQUID CRYSTAL DISPLAY PANEL

FIELD OF THE INVENTION

The present invention relates to a liquid crystal display panel used for a liquid crystal display apparatus which is one of image displays.

BACKGROUND OF THE INVENTION

Liquid crystal display apparatuses use a liquid crystal panel that uses the optical characteristic of a liquid crystal that changes its initial alignment orientation to another alignment state. Since the liquid crystal display apparatus can be driven by a lower voltage than conventional display apparatuses, it is suitable to be driven by LSIs, consumes low power, and allows its thickness and weight to be reduced. In recent years, in line with the trend of increasing the size of the screen and the capacity of the apparatus, the liquid crystal display apparatuses have been developed and commercialized so as to be mounted in OA or AV equipments.

Presently, depending on required features, relevant products include liquid crystal display apparatuses that use changes in the alignment state of the liquid crystal caused by the application of electric fields, that is, STN (super twisted nematic) liquid crystal display apparatuses based on a simple matrix method and using the electrooptical characteristic of the liquid crystal or TFT (thin film transistor) liquid crystal display apparatuses based on an active matrix method.

FIG. 8 shows a configuration drawing showing the basic structure of a liquid crystal display panel used for such a liquid crystal display apparatus. In this figure, 1 is a segment-side glass substrate; 2 is a common-side glass substrate; 3 is a sealing agent containing spacers; 4 is a common-side ITO (indium tin oxide) electrode formed of a transparent electrode film; 5 is a segment-side ITO electrode formed of a transparent electrode film; 6 is a vertical black matrix; 7 is an alignment layer; 8 is a spacer; 9 is a liquid crystal; and 10 is a color filter.

In this manner, the liquid crystal display panel used for the liquid crystal display apparatus has a sandwich structure in which the liquid crystal is sandwiched between the two glass substrates on which the transparent electrode pattern film is formed. A polymeric thin film is formed on the transparent electrode film to orient the liquid crystal. In the STN liquid crystal display panel, the cell thickness d between the substrates is normally 5 to 7 $\mu$m. In this liquid crystal display panel, the polymeric thin film is rubbed to control the alignment of the liquid crystal so as to provide a pretilt angle of 3° to 8°. In addition, the STN method uses the birefringence of the liquid crystal and the optical rotatory of light and provides a significantly-steep-threshold characteristic by twisting the alignment direction of the liquid crystal between the two substrates through an angle of 180° to 270°. Thus, the cell thickness d requires an accuracy equivalent to 0.05 to 0.1 $\mu$m according to the STN method.

In addition, since the liquid crystal molecules are twisted through the above angle within the predetermined thickness d, a trace amount of chiral agent is added to the liquid crystal to induce a specified twisted liquid crystal alignment. The trace amount of agent added depends on the alignment layer and pretilt angle, liquid crystal materials, the chiral agent, and the twist angle, and is normally 1 wt %.

The optical characteristics of the liquid crystal display panel are obtained by the birefringence and dielectric constant anisotropy $\Delta\in$ of the liquid crystal molecules. These optical characteristics vary depending on the composition of the liquid crystal materials including their viscosities and elastic constants or the adjustment of the composition ratio. Various liquid crystal materials are now developed and mixed together to provide desired characteristics.

$\Delta\in$ is set depending on the balance among the threshold voltage, drive waveform, cell thickness d, twist angle, and other optical characteristics taking into consideration the voltage resistance of LSIs that drive the liquid crystal display panel. The characteristics of the liquid crystal display panel are finally determined by the combination of $\Delta n \times d$, that is, the product of the birefringence of the liquid crystal $\Delta n$ and the thickness of the liquid crystal layer (cell thickness) d and the optical compensation configuration of an optical retardation film.

In the conventional liquid crystal display panel used for the STN liquid crystal display panel, in order to twist the nematic liquid crystal molecules sandwiched between the glass substrates through a predetermined twist angle, a chiral nematic liquid crystal or a cholesterol derivative is added as a chiral agent to induce a twisted alignment. Although, however, the chiral nematic liquid crystal is similar to the nematic liquid crystal in molecular shape and chemical and optical stability, the nature of the above chiral agent is inherently different from that of the nematic liquid crystal and causes various inconveniences in the liquid crystal display panel.

Specifically, due to its asymmetric carbon atoms of a high stereoscopic nature located at its molecular terminal group, the chiral agent obstructs the order of the alignment of the liquid crystal molecules in the liquid crystal bulk or interface to degrade the uniformity of the micro display. It also causes similar non-uniform display associated with the alignment of the spacers used to maintain the cell thickness d.

In addition, the addition of the chiral agent reduces the temperature (Tni point) changing from the nematic liquid crystal layer to an isotropic liquid to degrade the temperature characteristic, thereby forcing the characteristic balance (contrast and response speed) to be reduced to achieve the same temperature characteristic.

This invention solves these problems and provides a liquid crystal display panel that can improve alignment stability, display uniformity, and display quality.

DISCLOSURE OF THE INVENTION

To achieve this object, a liquid crystal display panel according to this invention is characterized in that the panel provides a uniform display by facilitating the stable alignment of liquid crystal materials and inducing a twisted alignment and in that it improves the balance among the optical characteristics.

One embodiment of the invention relates to a liquid crystal display panel comprising a liquid crystal sandwiched between two substrates each of which has aligning treatment applied to a transparent electrode pattern formed on one of its main surfaces, wherein 0.5 wt % or less of chiral agent is added to the liquid crystal and wherein the HTP (helical twist pitch) and cell thickness d meet the following relational expression when 1 wt % of chiral agent is added: $1.1 \times P \leq d$.

This configuration stabilizes the alignment in the liquid crystal display panel to improve display uniformity and improves the optical characteristics.

Another embodiment of the invention relates to a liquid crystal display panel according to the embodiment discussed above wherein the cell thickness d is 7 $\mu$m or more.

This configuration reduces the dependence on pitch variations in alignment margin to provide a stable alignment margin.

A further embodiment of the invention relates to a liquid crystal display panel according to the previously discussed embodiments wherein a twist angle through which the molecules of the liquid crystal are twisted is 240° or less.

This configuration provide a large alignment margin to maintain a stable alignment state against variations in d or P.

As described above, the liquid crystal display panel according to this invention facilitates the stable alignment of liquid crystal materials and induces a twisted alignment to provide a uniform display and to improve the balance among the optical characteristics.

BRIEF DESCRIPTION OF THE DRAWINGS

FIG. 7 is an explanatory diagram of a basic form of a liquid crystal display panel according to the same embodiment.

DESCRIPTION OF THE EMBODIMENTS

Figure 8:
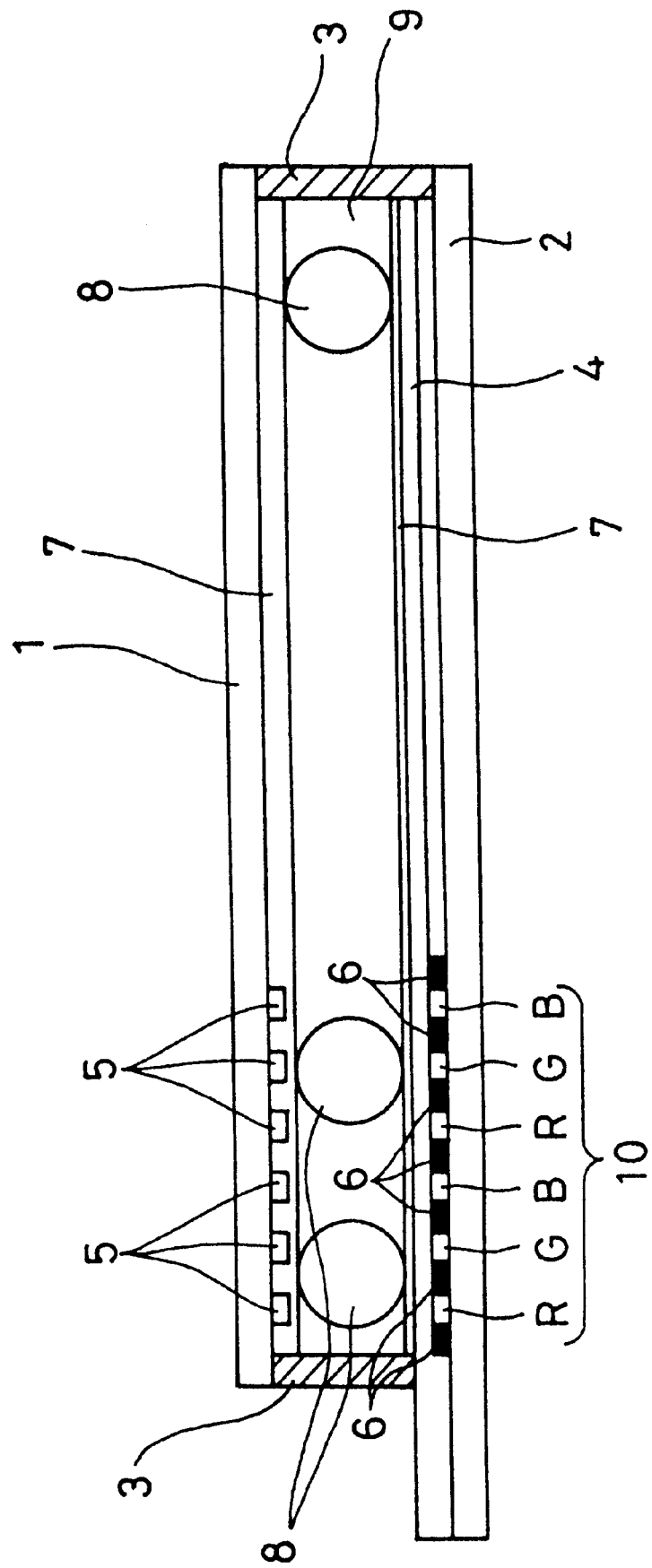
FIG. 8 is a drawing of the basic structure of the liquid crystal display panel according to the same embodiment.

A liquid crystal display panel indicating an embodiment of this invention is specifically described with reference to the drawings. Although the liquid crystal display panel configured as shown in FIG. 8 is also described in this section, its basic structure has already been described in "Prior Art". That is, as shown in FIG. 8, the crystal display panel comprises a segment-side glass substrate 1, a common-side glass substrate 2, sealing agent 3 enclosing spacers, a common-side ITO electrode 4 formed of a transparent electrode pattern, a segment-side ITO electrode 5 formed of a transparent electrode pattern, black matrix 6, alignment layers 7, spacers 8, a liquid crystal 9 and a color filter 10. The inter-substrate cell thickness d between the segment-side glass substrate 1 and the common-side glass substrate 2 is normally about 5 to 7 μm. In a liquid crystal display panel, a liquid crystal sandwiched between the two substrates is added with 1 wt % of a chiral agent so as to induce constant twists therein.

FIG. 7 is an explanatory diagram of this embodiment and a comparative example. This figure shows a list of conditions for each liquid crystal display panel used as a sample and the results of a sensor evaluation for uniformity. As shown in this figure, nematic liquid crystals of positive dielectric anisotropy were used for materials which exhibited an HTP (helical twist pitch) of 5, 5.5, 6, and 7 μm, respectively, when ester chiral nematic was added to each of the liquid crystal display panels. The refractive-index anisotropy Δn was 0.14, the cell thickness d was 6 or 7 μm, Δn×d was 0.84, and the twist angle was 250° or 240°.

Super video graphics arrays (SVGA) of 11.3 type were configured using the above conditions, and a drive waveform of 1/300 duty cycle, 1/18 bias, and 120 Hz frequency was added to these SVGA display panels to carry out a visual sensor evaluation for uniformity using a normally black configuration. The results of the evaluation are shown in the bottom of FIG. 7. As shown in this uniformity row, when 0.393 wt % of chiral nematic was added, the best result was obtained when the HTP was 5 μm and when the cell thickness d was 7 μm. For the twist angle, both 250° and 240° are shown to contribute to good results, but the most preferable value was 240° or less.

When 0.642 wt % of chiral nematic was added, the uniformity was unacceptable when the HTP was 7 μm and when the cell thickness d was 6 μm. When 0.458 or 0.504 wt % of chiral nematic was added, the uniformity was acceptable when the HTP was 5 or 5.5 μm and when the cell thickness d was 6 μm.

A 64 Hz static drive waveform was applied to these SVGA display panels to compare voltages at which micro uniformity was established visually, and it was also determined how the transition temperature (Tni) from the nematic liquid crystal to an isotropic liquid changed after the addition of the chiral agent. The results of the measurements are shown in FIGS. 1 to 6.

Figure 1:
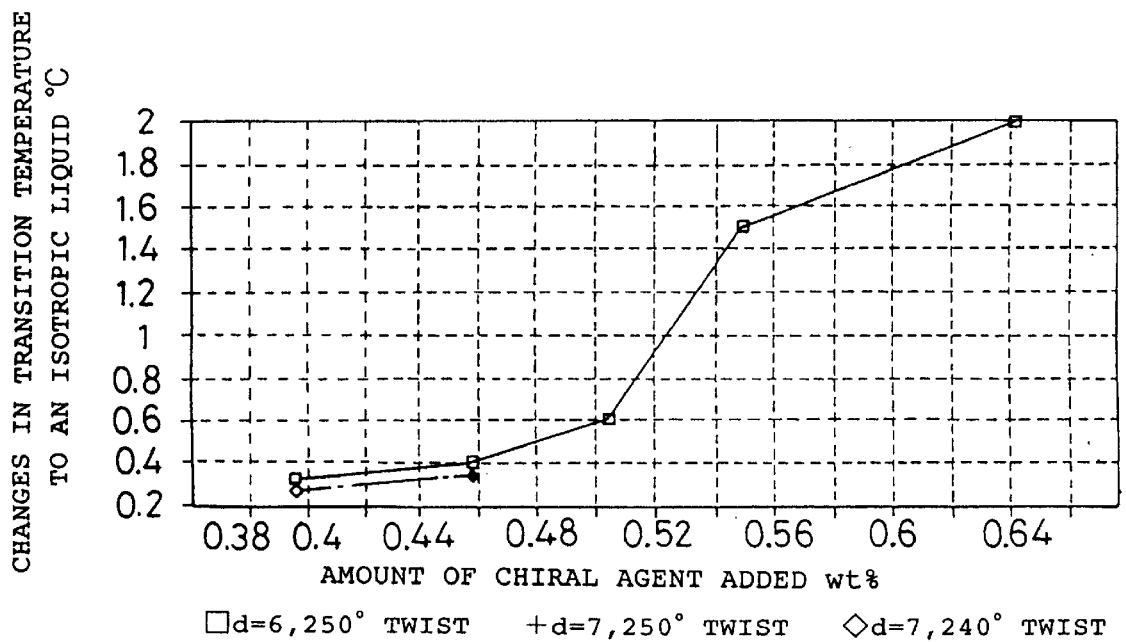
FIG. 1 shows the relationship between the change in the transition temperature from a nematic liquid crystal to an isotropic liquid and the amount of chiral agent added, which was evaluated using a liquid crystal display panel according to an embodiment of this invention.

FIG. 1 shows the relationship between the change in the transition temperature from the nematic liquid crystal to the isotropic liquid and the amount of chiral agent added, in the liquid crystal panels evaluated according to this embodiment. The change in the transition temperature to the isotropic liquid refers to values obtained by comparing the transition temperature measured when no chiral agent is added with the transition temperature measured after a chiral agent has been added. The performance of the liquid crystal is degraded as the transition temperature decreases. Accordingly, the smaller the change in transition temperature is, the more excellent the liquid crystal display panel is, and in FIG. 1, the performance of the liquid crystal display panel increases with decreasing value of the transition temperature. Thus, the results indicate that the performance increases with decreasing amount of chiral agent added. In the figure, "d=6" indicates a cell thickness of 6 μm, and "250° twist" indicates that a liquid crystal of twist angle 250° was used. "+" indicates a liquid crystal display panel using a liquid crystal of cell thickness 7 μm and twist angle 250°, while "◇" indicates a liquid crystal display panel using a liquid crystal of cell thickness 7 μm and twist angle 240°.

Figure 2:
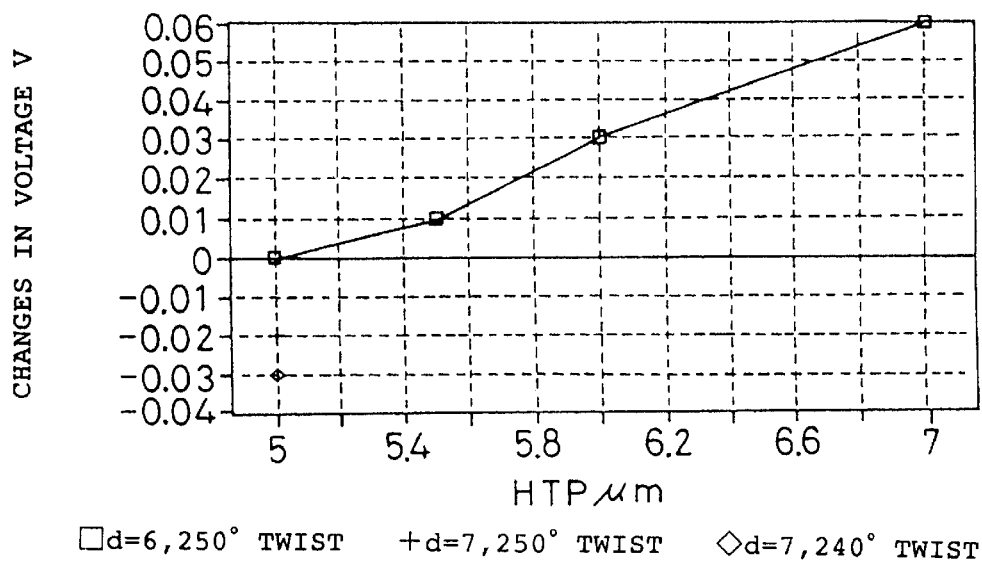
FIG. 2 compares voltages at which the display becomes uniform during the application of a static waveform according to the same embodiment wherein the voltage is zero under the following conditions: cell thickness d: 7 μm; HTP: 5 μm; and twist angle: 240°.

FIG. 2 is a comparatory diagram describing the relationship between the voltage and HTP and cell thickness d at which the display becomes uniform during the application of a static waveform, in the liquid crystal display panels according to this embodiment.

Under the condition "◊" (the cell thickness d was 7 μm, the HTP was 5 μm, and the twist angle was 240°), the voltage was zero because the display was uniform, thereby eliminating the need to apply a voltage. Under the condition "+", the display was not uniform so 0.01 V of voltage had to be applied relative to the condition "◊". Under the condition "□" 0.03 V of voltage was applied relative to the condition "◊" in order to make the display uniform. FIG. 1 indicates that the optimal conditions are an HTP of about 5 μm, a cell thickness d of 7 μm, and a twist angle of 240°.

Figure 3:
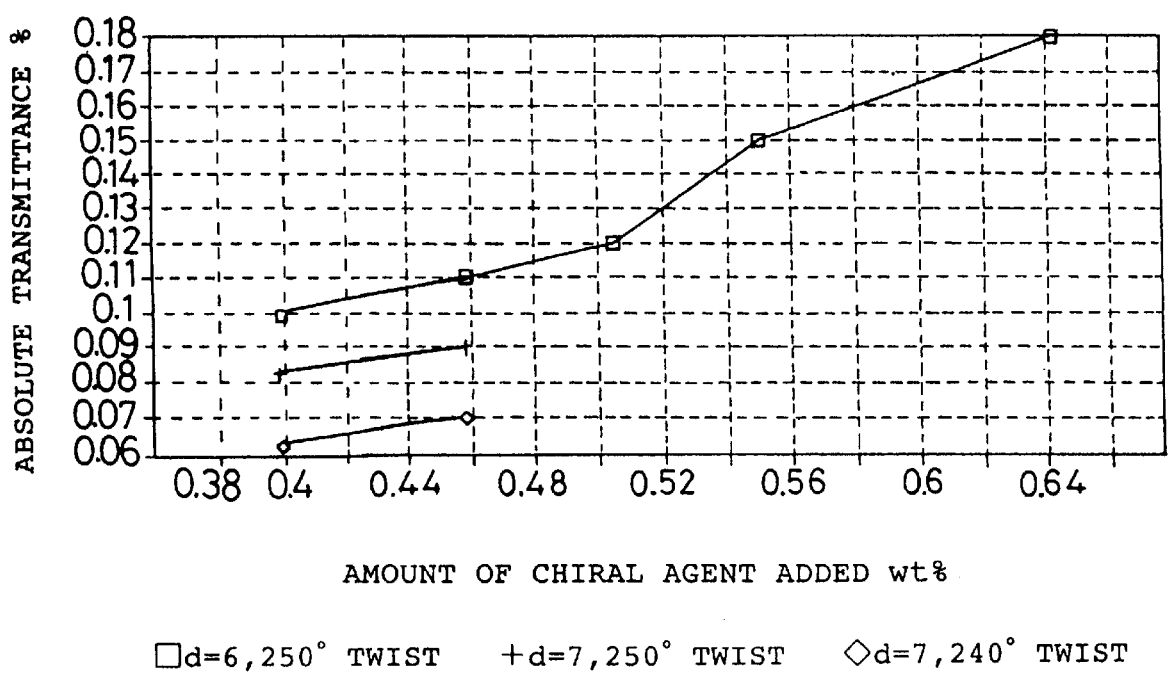
FIG. 3 compares the absolute transmittance with the amount of chiral agent added when the transmittance becomes lowest during the application of a static waveform according to the same embodiment.

FIG. 3 compares the absolute transmittance with the amount of chiral agent added when the light transmittance becomes lowest during the application of a static waveform, in the liquid crystal display panels according to this embodiment. The absolute transmittance refers to the ratio of the amount of light transmitted through a liquid crystal display panel with its transmittance minimized to the amount of light present prior to the transmission. The smaller the absolute transmittance is, the more excellent and the clearer the panel is. FIG. 3 shows that the absolute transmittance decreases with decreasing amount of chiral agent added. In addition, better results are obtained when the cell thickness d and twist angle are 7 μm and 240°, respectively, than when they are 6 μm and 250°, respectively.

Figure 4:
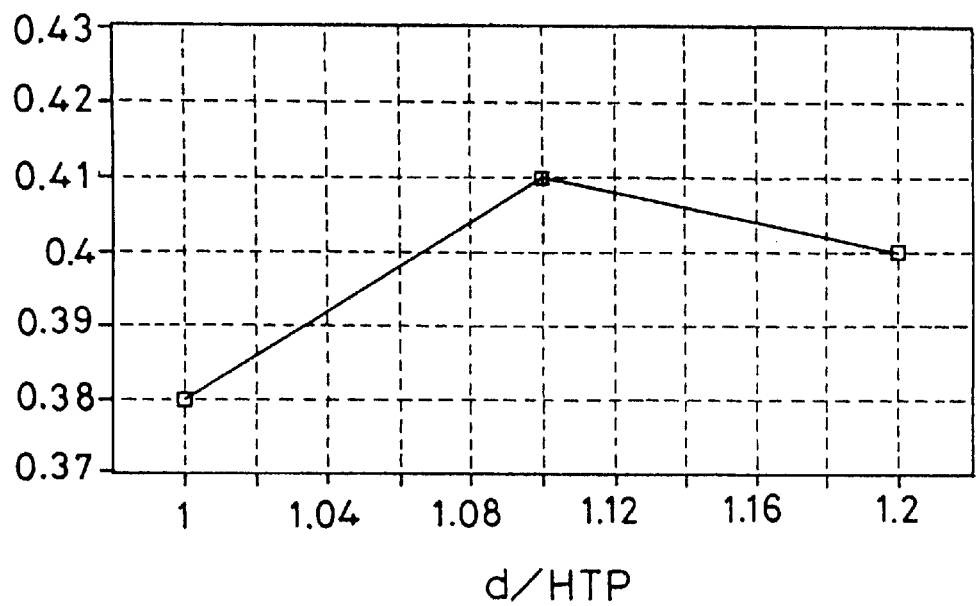
FIG. 4 shows the relationship between the d/HTP and the change in the transition temperature from the nematic liquid crystal to the isotropic liquid, which was evaluated according to the same embodiment.

FIG. 4 shows the relationship between the d/HTP and the change in the transition temperature from the nematic liquid crystal to the isotropic liquid, in the liquid crystal display panels evaluated according to this embodiment. The change in transition temperature is largest when the d/HTP is 1.1.

Figure 5:
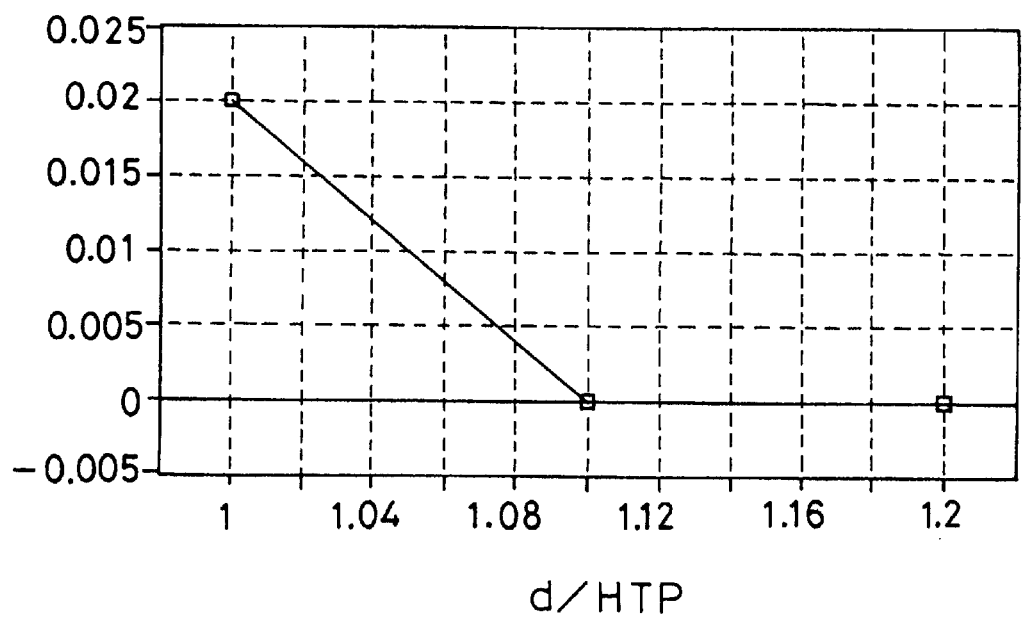
FIG. 5 compares voltages at which the display becomes uniform during the application of a static waveform according to the same embodiment wherein the voltage is zero under the following conditions: cell thickness d: 6 μm; HTP: 5 μm; and twist angle: 250°.

FIG. 5 shows the relationship between the voltage and d/HTP at which the display becomes uniform during the application of a static waveform, in the liquid crystal display panels according to this embodiment. When the cell thickness d was 6 μm, the HTP was 5 μm (d/HTP=1.2), and the twist angle was 250°, the display was uniform with no voltage applied. As is apparent from this figure, when the d/HTP was 1.1 or more, the change in voltage was zero and the display was uniform and provided excellent performance. The display, however, was not uniform when the d/HTP was less than 1.1, so a voltage had to be applied to make the display uniform.

Figure 6:
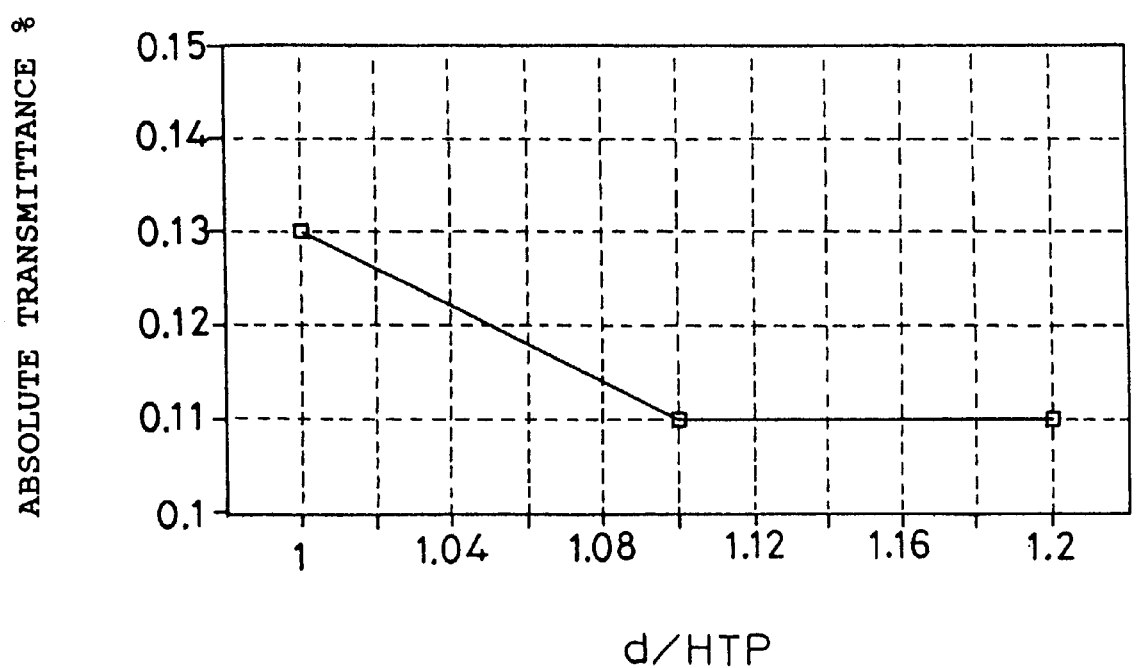
FIG. 6 compares the absolute transmittance with the d/HTP when the transmittance becomes lowest during the application of a static waveform according to the same embodiment.

FIG. 6 compares the absolute transmittance with the d/HTP when the transmittance becomes lowest during the application of a static waveform, in the liquid crystal display panels according to this embodiment. The absolute transmittance is as described in FIG. 3; the smaller the transmittance is, the less light is transmitted and the more excellent and the clearer the liquid crystal display panel is. Consequently, excellent liquid crystal display panels are obtained when the d/HTP is 1.1 or more.

(Result 1)

As shown in FIG. 7, by reducing the amount of chiral agent added, the uniformity and alignment stability can be obtained and the change in Tni can be reduced, thereby enabling the optical characteristics of the panel to be balanced. In this case, particularly high effects can be obtained by reducing the amount of chiral agent added down to 0.5 wt % or less and meeting the condition that (d/HTP) ≧1.1.

(Result 2)

Using the same Δn×d, alignment margin, and HTP (5 μm) for the liquid crystals with only the Δn adjusted and using a cell thickness d of 7 μm and a twist angle of 240°, an evaluation similar to that in Result 1 was executed. The results indicate that the alignment margin increases and thus uniformity is enhanced with increasing cell thickness d and decreasing twist angle. In addition, the effects can be improved by meeting the condition that (d/HTP) ≧1.1.

Thus, the above embodiment improved alignment stability, display uniformity, and further display quality. In particular, a stable alignment margin could be obtained when the cell thickness d was 7 μm or more and when the twist angle was 240°. Under these conditions, the above effects can be further improved.

Although the above embodiment uses the ester chiral nematic liquid crystal as a chiral agent, similar effects have been confirmed using several other chiral agents such as biphenyl.

What is claimed is:

1. A liquid crystal display panel, comprising:
   a liquid crystal composition sandwiched between two substrates, each of the substrates including an alignment treatment applied to a transparent electrode pattern formed on one of its main surfaces; and
   0.5 wt % or less of a chiral agent is present in said liquid crystal composition;
   wherein the distance d between the two substrates satisfies the relationship d/HTP ≦1.1.

2. A liquid crystal display panel according to claim 1 wherein the cell thickness d is 7 μm or more.

3. A liquid crystal display panel according to claim 1 wherein a twist angle through which liquid crystal molecules are twisted is 240° or less.

* * * * *